United States Patent [19]

Miller et al.

[11] Patent Number: 5,472,728

[45] Date of Patent: Dec. 5, 1995

[54] EDIBLE FAT-CONTAINING MARGARINE TYPE PRODUCTS AND PROCESS FOR PREPARING SAME

[75] Inventors: Mark S. Miller, Arlington Heights; Gregory S. Buliga, Mount Prospect; Ronald L. Meibach, Deerfield, all of Ill.

[73] Assignee: Kraft Foods, Inc., Northfield, Ill.

[21] Appl. No.: 231,033

[22] Filed: Apr. 22, 1994

[51] Int. Cl.$^6$ ..................................... A23D 7/00
[52] U.S. Cl. .................. 426/601; 426/604; 426/611; 426/613
[58] Field of Search ..................... 426/601, 603, 426/602, 607, 611, 613, 604

[56] References Cited

U.S. PATENT DOCUMENTS

| | | | |
|---|---|---|---|
| 4,446,166 | 5/1984 | Giddey | 426/631 |
| 4,632,840 | 12/1986 | Takahashi | 426/611 |
| 4,650,690 | 3/1987 | Bams | 426/602 |
| 4,849,243 | 7/1989 | Sreenwasau | 426/603 |
| 4,888,197 | 12/1989 | Wieske | 426/603 |
| 4,940,601 | 10/1990 | Orphanos et al. | 426/601 |
| 5,017,398 | 5/1991 | Jandacek et al. | 426/603 |
| 5,045,337 | 9/1991 | El-Nokaly | 426/611 |
| 5,064,677 | 11/1991 | Cain | 426/611 |
| 5,149,560 | 9/1992 | Kealey | 426/631 |
| 5,232,734 | 8/1993 | Takemori | 426/660 |
| 5,258,184 | 11/1993 | Bee | 426/602 |
| 5,279,847 | 1/1994 | Okonogi | 426/603 |
| 5,306,517 | 4/1994 | Norton | 426/603 |
| 5,322,704 | 6/1994 | Gaonkar | 426/607 |
| 5,352,475 | 10/1994 | Tholl | 426/601 |

FOREIGN PATENT DOCUMENTS

| | | |
|---|---|---|
| 2100588 | 2/1989 | Australia . |
| 3007489 | 2/1990 | Australia . |
| 4712089 | 6/1990 | Australia . |
| 4976990 | 8/1990 | Australia . |
| 6197090 | 3/1991 | Australia . |
| 304130 | 2/1989 | European Pat. Off. . |
| 379747 | 8/1990 | European Pat. Off. . |
| 383380 | 8/1990 | European Pat. Off. . |
| 398412 | 11/1990 | European Pat. Off. . |
| 415468 | 3/1991 | European Pat. Off. . |
| 434150 | 6/1991 | European Pat. Off. . |
| 434151 | 6/1991 | European Pat. Off. . |
| 449350 | 10/1991 | European Pat. Off. . |

OTHER PUBLICATIONS

Kirk 195 Encyclopedia of Chemical Technology vol. 5 pp. 702–703 The Interscience Encyclopedia Inc NY.

Schick 1987 Nonionic Sufactants Physical Chemistry Marcel Dekker Inc New York pp. 439–446.

*Primary Examiner*—Carolyn Paden
*Attorney, Agent, or Firm*—Fitch, Even, Tabin & Flannery

[57] ABSTRACT

In one aspect of the invention, a method is provided for manufacture of an edible fat containing product which is a water-in-oil emulsion having discrete droplets of an oil-in-water emulsion dispersed therein. The method includes the steps of providing an oil-in-water emulsion at a temperature where the oil phase is liquid. A separate water-in-oil emulsion is provided at a temperature wherein the oil phase is liquid. The water-in-oil emulsion is cooled to a temperature such that at least about 5% of the oil phase is crystallized. The oil-in-water emulsion is combined with the water-in-oil emulsion and the combined emulsions are immediately cooled with agitation so that the oil phase of the water-in-oil emulsion substantially crystallizes to entrap discrete droplets of the oil-in-water emulsion.

20 Claims, 2 Drawing Sheets

EDIBLE FAT-CONTAINING MARGARINE TYPE PRODUCTS AND PROCESS FOR PREPARING SAME

FIELD OF THE INVENTION

The present invention relates generally to edible fat-containing products of the margarine type. More particularly, the present invention relates to a margarine type spread having a novel emulsion configuration which is a water-in-oil emulsion having discrete droplets of an oil-in-water emulsion dispersed therein. Either or both of the oil phases may comprise indigestible polyol fatty acid polyesters. The invention further relates to processes for the preparation of such products.

BACKGROUND OF THE INVENTION

The invention relates to edible fat-containing products comprising indigestible polyol fatty acid polyesters. In particular, although not exclusively, the invention relates to such products of the emulsion type, such as margarines and low-fat spreads. The invention further relates to processes for the preparation of such products.

Polyol fatty acid polyesters, and in particular, the sugar fatty acid polyesters, such as, e.g., the sucrose fatty acid polyesters, are known as suitable low-calorie fat replacers in edible products. Substantially indigestible for human beings they have physical and organoleptic properties very similar to triglyceride oils and fats conventionally used in edible products. Polyol fatty acid polyesters are also reported to have use as pharmaceutical acceptable agents, e.g., in view of their ability to take up fat soluble substances, such as in particular cholesterol, in the gastrointestinal tract, and subsequently remove those substances from the human body. Accordingly, it is attractive to replace at least part of the fat in edible fat-containing products by polyol fatty acid polyesters.

It is further reported that in food products, the use of polyol fatty acid polyesters which are liquid at body temperature, may give rise to the so-called problem of anal leakage. Accordingly, it is particularly attractive to replace the more solid part (hardstock) of a fat source with polyol fatty acid polyesters.

Edible fat-containing products comprising indigestible polyol fatty acid polyesters are know in the art and described in U.S. Pat. Nos. 3,600,186, 4,005,195, 4,005,196, 4,034,083 and EP Patent Publication Nos. 233 856, 236 288 and 235 836.

In this specification, unless otherwise indicated, the term "fat" refers to edible fatty substances in a general sense, including natural or synthesized fats and oils consisting essentially of triglycerides, such as, for example, soybean oil, sunflower oil, palm oil, coconut oil, margarine oil, fish oil, lard and tallow, which may have been partially or completely hydrogenated or modified otherwise, as well as non-toxic fatty materials having properties similar to triglycerides, which materials may be indigestible, such as for example, waxes, jojoba oil and hydrogenated jojoba oil and polyol fatty acid polyesters referred to hereinafter in more detail. The terms fat and oil are used interchangeably.

In this specification, the term "polyol" is intended to refer to any aliphatic or aromatic compound which comprises at least four free hydroxyl groups. Such polyols in particular include the group of sugar polyols, which comprises the sugars, i.e., the mono-, di- and polysaccharides, the corresponding sugar alcohols and the derivatives thereof having at least four free hydroxyl groups. Examples of sugar polyols include glucose, mannose, galactose, xylose, fructose, sorbose, tagatose, ribulose, xylulose, maltose, lactose, cellobiose, raffinose, sucrose, erythritol, mannitol, lactitol, sorbitol, xylitol and alpha-methylglucoside. A generally used sugar polyol is sucrose.

In this specification, the term "polyol fatty acid polyester" is intended to refer to any such polyesters or mixtures thereof of which, on an average, more than 70% of the polyol hydroxy groups have been esterified with fatty acids.

In this specification by "indigestible" is meant that at least about 70% by weight of the material concerned is not digested by the human body. In this specification, the hydrophile-lipophile balance (HLB) of an emulsifier is used to classify the emulsifier in terms of its relative simultaneous attraction to the oil phase and the water phase of an emulsion; see, for example, Schick, *Nonionic Surfactants: Physical Chemistry*, pp. 439–47 (Marcel Dekker, Inc., New York, N.Y.; 1987). As noted in Schick at page 439, "[s]urfactants with a low HLB number normally form W/O emulsions, whereas those with high HLB numbers for O/W emulsion." For purposes of this invention, a low HLB surfactant has an HLB less than about 4.5 and a high HLB surfactant has an HLB greater than about 4.5.

In this specification, by "hardstock" is meant that part of the fat composition is characterized by a slip melting point of above 36° C. "Slip melting point" is defined as the temperature at which the amount of solid phase in the melting fat has become so low that an air bubble is forced upwards in an open capillary filled with the fat.

Fat-containing products and in particular, emulsion type products such as margarines and low-fat spreads, have to comply with requirements such as oral response, thermal stability, cycle stability, spreadability, melting behavior and the like. Often they have to comply with such requirements simultaneously.

In particular, for margarines and low-fat spreads which contain relatively large amounts of polyunsaturated components or require increased softness at lower (refrigerator) temperatures, it can be difficult to simultaneously comply with the requirements for cycle stability, thermal stability and acceptable taste properties.

Stability against temperature changes (cycle stability) is important in view of temperature changes during transport and storage as well as temperature changes which may frequently occur during household use. Improved storage temperature cycle stability is therefore advantageous, if not essential, Heat stability, i.e., stability in terms of the absence of phase separation and of oil exudation, determines the ambient temperatures at which the product can be used. It will be clear that heat stability requirements are dependent of the climatic zone involved.

In general, the heat stability is governed by the amount of hardstock, i.e., the amount of higher melting fats. A better heat stability, however, in general will result in a deterioration of the oral response, especially after temperature cycling. This is because the oral response largely depends on the melting behavior of the fat phase.

Although not wishing to be bound by an theory, it is believed that the difficult compatability of heat stability, good oral response and cycling stability stems from the fact that good heat stability (e.g., heat stability at 30° C. for 24 hours) generally requires blended fat compositions containing relatively high amounts of higher melting fat fractions such as in particular fat fractions having melting points above mouth temperature. These higher melting fat fractions are believed to be responsible for the adverse effects on oral response and cycling stability.

Generally, in conventional fat-containing products, the higher melting fat fractions crystallize in mixed crystals of non-equilibrium composition, which incorporate considerable amounts of the lower-melting fat fractions. In a well formulated blend, the melting point of the mixed crystals is just below mouth temperature. Accordingly, in the mouth such blends will melt entirely, not giving rise to waxiness and, in the case of emulsions, fully releasing the salt and flavor compounds present in the water phase.

However, when conventional fat-containing products are subjected to temperature cycling, the mixed crystals demix, and a separate, purer fraction of the higher melting fats crystallizes. In this process, a network of crystals is formed, which, if a dispersed water phase is present, surrounds and stabilizes the dispersed water droplets in the form of shells. In the mouth the non or only partially melting network of crystals introduces a waxy taste, and prevents release of salt or flavor compounds from the dispersed water droplets which remain stabilized.

Conventional products displaying good heat stability often combine this property with a rather bad cycling stability and oral response. Conventional products having improved cycle stability due to the presence of a relatively small amount of high melting fats often suffer poor heat stability.

Many of the problems associated with the requirements for cycle stability, thermal stability and acceptable taste properties can be overcome by the compositions and method of the present invention wherein two fat phases in separate emulsions can be combined to tailor the fat properties required for solution of these problems. Also, the problem of anal leakage associated with the use of polyol fatty acid polyesters can be effectively overcome by the method and products of the present invention.

SUMMARY OF THE INVENTION

In one aspect of the invention, a method is provided for manufacture of an edible fat containing product which is a water-in-oil emulsion having discrete droplets of an oil-in-water emulsion dispersed therein. The method includes the steps of providing an oil-in-water emulsion at a temperature where the oil phase is liquid. A separate water-in-oil emulsion is provided at a temperature wherein the oil phase is liquid. The water-in-oil emulsion is cooled to a temperature such that at least about 5% of the oil phase is crystallized. The oil-in-water emulsion is combined with the water-in-oil emulsion and the combined emulsions are immediately cooled with agitation so that the oil phase of the water-in-oil emulsion substantially crystallizes to entrap discrete droplets of the oil-in-water emulsion.

The edible fat containing products of the invention are characterized by the inclusion of four separate phases. These include a continuous oil phase having droplets of water dispersed therein and also having discrete particles of a continuous water phase containing droplets oil dispersed therein.

DETAILED DESCRIPTION OF THE INVENTION

In accordance with the present invention, a continuous oil phase is provided in which is dispersed aqueous droplets and discrete droplets of an oil-in-water emulsion. As used herein, the terms "fat" and "oil" are used interchangeably and may refer to fats or oils which have a low melting point, which are liquid at room temperature, an intermediate melting point, which melt at temperatures between room temperature and body temperature and a high melting point which melt above body temperature.

Figure 1:
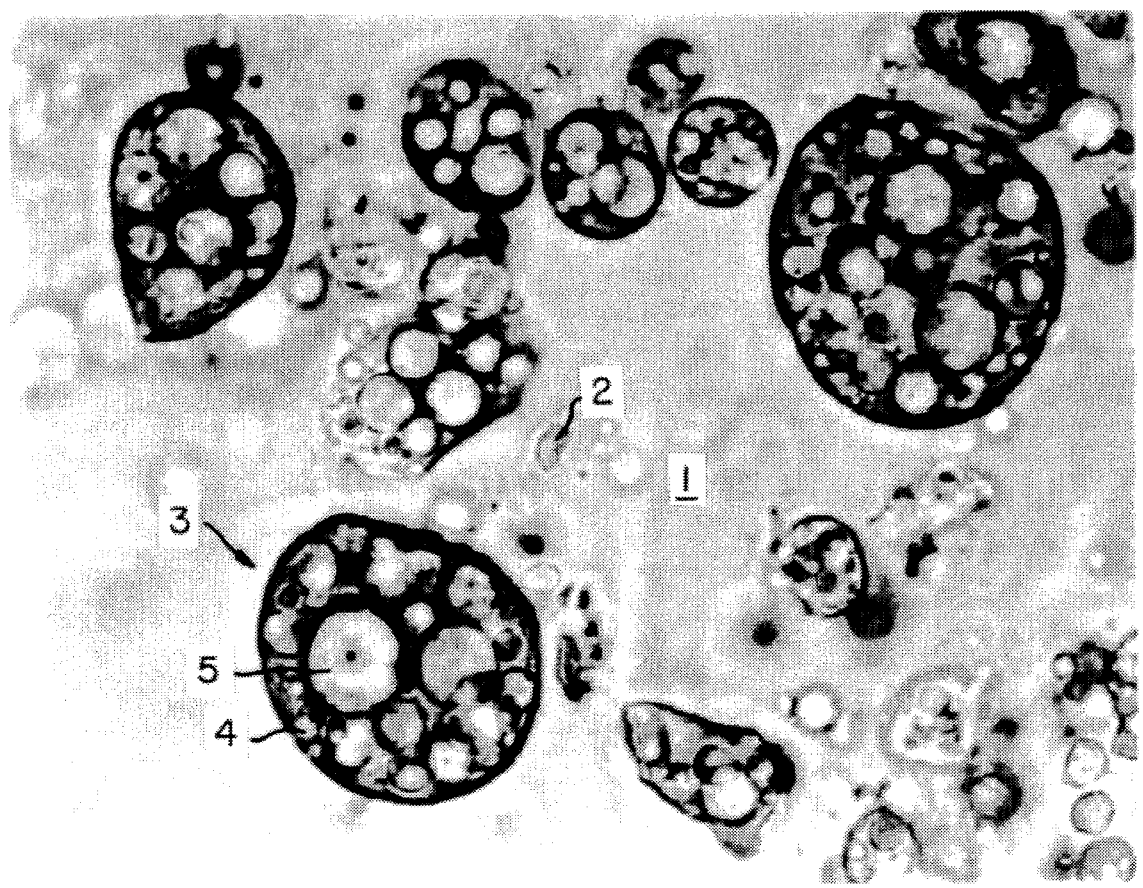
FIG. 1 is a photomicrograph of an edible oil product produced in accordance with the method of the present invention.

Referring now to FIG. 1, a continuous oil phase 1 is provided. In the continuous oil phase are dispersed aqueous droplets 2 and discrete droplets of oil-in-water emulsion 3. The oil-in-water emulsion 3 consists of a continuous water phase 4 in which is dispersed droplets of oil 5.

The two oil phases, 1 and 5, may be provided by triglyceride fats and oils or polyol fatty acid polyesters.

Suitable triglyceride fats include vegetable oils and partially or fully hydrogenated vegetable oils, such as soybean oil, cottonseed oil, rapeseed oil, canola oil, corn oil, safflower oil, coconut oil and palm kernel oil or may be an animal fat, such as butterfat or lard.

Suitable polyol fatty acid polyesters have been defined in chemical terms hereinbefore. Preferably, polyol fatty acid polyesters derived from sugars or sugar alcohols are applied, and in particular, sugar fatty acid polyesters derived from disaccharides, such as sucrose. Sugar fatty acid polyesters have been found to be very suitable, of which at least 40% of the fatty acid residues are derived from saturated fatty acids, in particular, saturated $C_8$–$C_{22}$ fatty acid. Sucrose polyesters of which at least 70% of the fatty acid residues are derived from $C_{12}$–$C_{18}$ fatty acids, are preferred.

By variation of the particular blend of fatty acid residues used in the synthesis, the melting point of the polyol fatty acid polyesters can be influenced. More saturated and/or long-chain fatty acid residues result in a higher melting point than unsaturated and/or short chain fatty acid residues. The slip melting point of the hardstock polyol fatty acid polyesters preferably lies within the range of from 37° C. to 55° C., in particular from 40° C. to 50° C.

In general, fatty acids, per se, or naturally occurring fats and oils may be used as sources for the fatty acid residues in the polyol fatty acid polyesters. Conventional techniques may be used to introduce, if necessary, the required degree of saturation. Such suitable techniques include full or partial hydrogenation, interesterification, transesterification and fractionation and may be used before or after conversion of the polyols to polyol fatty acid polyesters.

Suitable polyol fatty acid polyesters are used which are completely or partially derived from transhydrogenated triglycerides or the corresponding lower alkyl esters thereof, as described in EP 235 836. Alternatively, the desired level of trans fatty acid residues may also be introduced by first converting to the polyol fatty acid polyester and subsequent transhydrogenation.

As defined hereinabove, the desired polyol fatty acid polyesters have, on an average, more than 70% of the polyol hydroxy groups esterified with fatty acids. Preferably, polyol fatty acid polyesters are used with higher degrees of conversion, in particular, polyol fatty acid polyesters of which, on an average, more than 8% or even over 95% of the polyol hydroxyl groups have been esterified with fatty acids.

The edible fat-containing products of the invention in general have an overall fat content, including both the continuous phase 1 fat and the dispersed phase 5 fat, of from between about 30% to about 80%. All percentages used herein are by weight, unless otherwise indicated. The phase 1 continuous oil phase is preferably an intermediate or high melting point fat. The dispersed phase 5 fat can be selected from low melting point, intermediate melting point and high melting point fats. In general, when an intermediate melting point fat, such as butterfat is used as the phase 1 fat, and a high melting point fat is used as the phase 5 fat, an easy melting product is provided. If the phase 1 fat is a polyol fatty acid polyester, which is subject to an anal leakage problem, a high melting point fat can be used as dispersed phase 5 to confer anti-anal leakage properties to the edible fat composition of the present invention. If the phase 1 fat is an intermediate or high melting point fat and the phase 5 fat is a low melting point fat, a firm, spreadable product is provided which is plasticized by the dispersed phase 5 fat. Flavors can be carried in the low melting point phase 5 fat to provide instant flavor release when the edible fat composition is consumed. When the phase 1 fat is an intermediate melting point fat and the phase 5 is also an intermediate melting point fat, the same fat can be used in both phases to allow compartmentalization of ingredients, such as flavors and vitamins for protection of the ingredients and suitable release of the ingredients when consumed.

It should be understood that the two aqueous phases, phase 2 and phase 4, are substantially different. Phase 2 is a thickened hydrocolloid solution containing either gelling hydrocolloids, such as gelatin, alginates, starch and carrageenan, or a non-gelling hydrocolloid, such as xanthan gum and high DE maltodextrins. The phase 4 aqueous phase contains emulsifiers typical of an oil-in-water emulsion, such as egg yolk, milk protein and high HLB emulsifiers, such as polysorbate 60.

A summary of the two oil phases and the two water phases is as follows:

| Phase # | Composition | Function |
|---|---|---|
| 1 | Intermediate to High Melting Point Polyester; Low HLB emulsifier | Continuous phase for a tablespread product - this phase is responsible for oily mouthfeel & lubricity |
| 2 | Water, hydrocolloid(s) salt; preservatives; flavor & color | This aqueous phase plasticizes the continuous fat phase 1; this aqueous phase is responsible for spreadability and to aid in processing |
| 4 | Water; egg yolk or milk protein or high HLB emulsifier; acidulant | This aqueous phase stabilizes the oil-in-water emulsion and this phase is responsible for protection and controlled release of the dispersed oil phase 5 |
| 5 | Low to high melting point polyester; oil soluble flavors | This oil phase is a carrier for oil soluble flavors and acts as a plasticizer of the continuous fat phase I - High melting point fats can be used as an anti-anal leakage agent for polyol fatty acid continuous phase I |

Fat-containing products, such as conventional margarines, have a high amount of unsaturated components and, of course, are characterized by the presence of large amounts of liquid oil. The use of liquid oil leads to the problem that is difficult to provide sufficient thermal stability and hardness. The present invention permits the preparation of products having sufficient hardness, without the necessity of a decrease in the amount of unsaturated fatty acids and without a deterioration in release of fats and mouthfeel. The amount of polyunsaturated fatty acid residues in the present edible fat product is preferably between about 40% and about 80%, in particular, at least about 50% to about 60% by weight of the total amount of fatty acid residues present in the two fat phases.

Although the present invention is particularly suitable to preparation of products of the water-in-oil type, such as margarines and spreads, the advantages of the invention may be equally applied to products of the oil-in-water emulsion type, such as mayonnaise and salad dressings or non-emulsion type products, such as shortenings.

The method of the present invention is directed to a process for blending two emulsion products which are particularly formulated and processed to prevent coalescence of interior emulsion droplets or inversion of the interior emulsion to result in a single emulsion.

Figure 2:
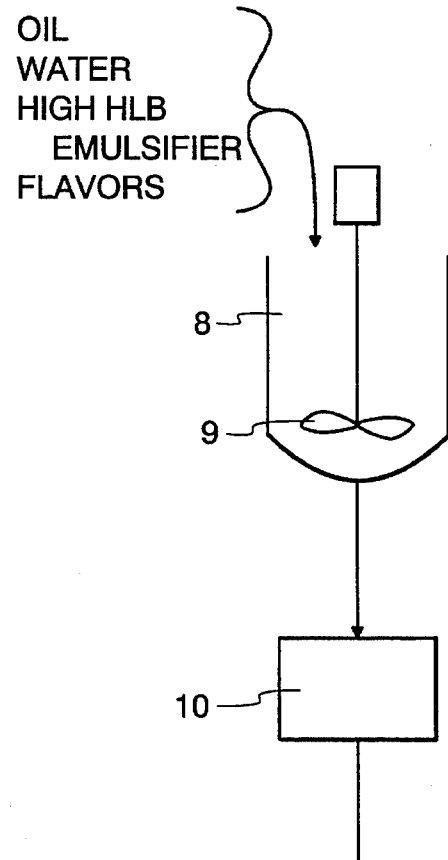
FIG. 2 is a flow diagram of the process of the present invention for producing an edible fat-containing product.

As shown in FIG. 2, oil, water, a low HLB emulsifier, a hydrocolloid and any flavors which are to be used are added to a mixing tank 6. The components added to mixing tank 6 are blended by agitator 7 to provide a water-in-oil emulsion. Concurrently, oil, water, high HLB emulsifiers and flavors, if required, are added to mixing tank 8. These components are formed into an oil-in-water emulsion by means of agitator 9. In general, the ratio of oil to water in the water-in-oil emulsion in tank 6 is in the range of from about 1:2 to about 4:1. The ratio of oil to water in the oil-in-water emulsion in tank 8 is in the range of from about 1:4 to about 4:1. The two emulsions are blended in a ratio of the water-in-oil emulsion to oil-in-water emulsion of from about 1:4 to about 3:1.

The loose oil-in-water emulsion from tank 8 is passed through a high shear mixer 13 and a scraped surface heat exchanger 15 to provide a mayonnaise type emulsion wherein oil droplets are tightly packed in a continuous water phase. The temperature of the oil-in-water emulsion after leaving heat exchanger 15 is in the range of from about 20° C. to about 30° C.

The loose water-in-oil emulsion from tank 6 is passed through a high shear mixer 10 to provide a tablespread type emulsion wherein the water droplets are tightly packed in a continuous oil phase. The emulsifiers are selected to maintain the continuous oil phase with tightly packed water droplets during subsequent processing. Suitable low HLB emulsifiers such as, for example, mono/diglycerides can be used.

The temperature of the water-in-oil emulsion in tank 6 is preferably in the range of from about 40° C. to about 60° C. to insure complete fluidization and melting of the oil phase in tank 6. After leaving mixer 10, the water-in-oil emulsion is passed through a scraped surface heat exchanger 11 to reduce the temperature of the water-in-oil emulsion to within the range of from about 20° C. to about 30° C. and to partially crystallize the oil phase. This reduction of temperature in a scraped surface heat exchanger results in equilibrating the viscosity of the water-in-oil emulsion to that of the oil-in-water emulsion from tank 8. Preferably, the viscosity of both the water-in-oil emulsion from tank 6 and oil-in-water emulsion from tank 8 are similar to that of mayonnaise at a temperature in the range of 20° C. to 30° C.

The two emulsions are combined and are then transferred through a second scraped surface heat exchanger 17 to immediately cool the two emulsions and to crystallize the oil phase of the water-in-oil emulsion so as to trap discrete droplets of oil-in-water emulsion as shown in FIG. 1. The viscosity of the water-in-oil emulsion from tank 6 and tank 8 are controlled by controlling the exit temperature from the scraped surface heat exchangers 11 and 15.

The composition of the two emulsions used in preparing the edible fat product of the invention can be infinitely variable in terms of selecting fat components for the two fat phases, i.e., phase 1 and phase 5. Unique properties can be imparted to the edible fat products of the invention through selection of particular triglyceride fats and polyol fatty acid polyesters, The following examples further illustrates various features of the invention, but are intended to in no way limit the scope of the invention as set forth in the appended claims.

EXAMPLE 1

An 80% oil product was prepared in which the oil-in-water emulsion used was a full fat commercial mayonnaise. The water-in-oil emulsion was prepared by combining 80% of a mixture of margarine oil and emulsifiers and 20% of an aqueous composition. The mixture was heated while stirring in a jacketed beaker using an overhead mixer to a temperature of 40° C. The mixture was stirred while cooling to 25° C. to partially crystallize the margarine oil. Commercial mayonnaise was added to the beaker while stirring and was mixed thoroughly with the margarine prototype emulsion. The mixture of the two emulsions was transferred to a small scraped surface heat exchanger where the mixture was cooled with stirring to crystallize the margarine oil.

The following ratios of the water-in-oil emulsion containing margarine oil and the oil-in-water emulsion comprising a commercial mayonnaise was used to prepare multiple emulsions having the following ratios of water-in-oil emulsion to oil-in-water emulsion.

TABLE 1

| Sample # | Water-In-Oil (W/O) | Oil-In-Water (O/W) | Ratio of o/w to o/w |
|---|---|---|---|
| 1 | 250 g | 250 g | 1:1 |
| 2 | 300 g | 150 g | 2:1 |
| 3 | 300 g | 100 g | 3:1 |

The water-in-oil emulsion was prepared by combining an aqueous phase having 25 grams of non-fat dry milk, 25 grams of salt, 1.5 grams of potassium sorbate and 250 grams of water with an oil phase containing 200 grams of margarine oil, 0.55 grams of lecithin, 0.45 grams of mono- and diglycerides, 0.45 grams flavor, 0.25 grams beta-carotene.

The water-in-oil emulsion was prepared by heating the oil phase to a temperature of 40°C. The oil phase was stirred with a Lightning mixer while adding the appropriate amount of the aqueous phase to provide an 80% oil continuous emulsion. The emulsion was transferred to a jacketed beaker maintained at 25° C. Mixing was continued until the mixture thickened and turned opaque, which took place at a temperature of approximately 25° C. An appropriate amount of commercial mayonnaise as set forth in the table hereinabove was added to the water-in-oil emulsion in the jacketed beaker. The mixture was thoroughly stirred throughout the product to assure thorough mixing. The mixture of the two emulsions was then transferred to a scraped surface heat exchanger which was at a temperature of about −30 C. The two emulsions were mixed until smooth and a crystallized emulsion formed. The mixture was transferred to margarine tubs and hardened in a refrigerator.

The results were uniform and provided an excellent margarine type product. All of the products showed rapid melt in the mouth, as expected for a good margarine type product. All of the products were exceptionally smooth and there was no graininess. Photomicrographs were taken and confirmed the structure as characterized by FIG. 1.

EXAMPLE 2

In this example, a 60% oil product was prepared in which polyol fatty acid polyester and soybean oil replaced margarine oil. Both emulsion phases (i.e., the water-in-oil emulsion and the oil-in-water emulsion phases) contained sucrose polyester, and the oil-in-water phase contained sucrose polyester and soybean oil mixed in a proportion to match the firmness of a blended margarine oil made from partially hydrogenated soybean oil.

Preparation of the Oil-in-Water Emulsion—The oil-in-water mayonnaise-type emulsion contained approximately 40% oil, all of which was sucrose polyester. It was prepared by first forming an oil phase preemulsion of sucrose polyester in a xanthan solution, and then incorporating the preemulsion into a dispersion of the remaining aqueous ingredients.

The composition of the oil phase preemulsion was as follows:

| Ingredient | Percent | Weight % |
|---|---|---|
| Sucrose Polyester | 50.00 | 101.025 |
| Water | 49.75 | 100.520 |
| Xanthan Gum | 0.25 | 0.505 |
| Total | 100.00 | 202.050 |

The xanthan gum was dissolved in the water by slowly adding it into the vortex created by an overhead mixer (Lightning mixer). When the xanthan was fully dissolved, the solution was heated to 40° C. The sucrose polyester was also heated to 40° C. which was above its melting point. The melted sucrose polyester was slowly added to the xanthan solution while the mixture was being homogenized with a Polytron mixer.

An aqueous phase was prepared which contained the following ingredients:

| Ingredient | Weight (g) |
|---|---|
| Whole egg mix (salted) | 21.31 |
| Water | 13.63 |
| Egg Yolk | 4.25 |
| Sucrose | 1.55 |
| Salt | 0.75 |
| Total | 41.31 |

The mixture was prepared using a Polytron mixer. While the aqueous composition was being homogenized with the Polytron, the oil phase preemulsion was slowly added over a 3 minute period. The weight of added oil phase preemulsion was 202.05 g. After the oil phase addition step, 6.665 g of vinegar was added, followed by 3.772 g of xanthan, both while mixing with the Polytron mixer.

The final composition of the oil-in-water emulsion phase prepared as described above was:

| Ingredient | Percent |
| --- | --- |
| Water | 45.31 |
| Sucrose Polyester | 40.10 |
| Whole Egg Mix | 8.39 |
| Vinegar | 2.64 |
| Egg Yolk | 1.69 |
| Xanthan | 0.95 |
| Sucrose | 0.62 |
| Salt | 0.30 |
| Total | 100.00 |

The mouthfeel texture of the oil-in-water emulsion was similar to that of full fat mayonnaise. The viscosity and yield values were determined using a Brookfield viscometer equipped with a T-bar C spindle, at 10 RPM with a Helipath stand. The yield value was 552 poise and the viscosity was 456 poise, which are typical values for mayonnaise-type products.

Preparation of the Water-in-Oil Emulsion—The water-in-oil tablespread-type emulsion contained approximately 80% of an oil phase which contained a blend of sucrose polyester and soybean oil. The ratio of sucrose polyester to soybean oil had been previously determined to be similar in firmness to blended margarine oil both at room temperature and refrigerated. An oil phase was prepared first, into which was blended an aqueous composition.

The oil phase was prepared by melting together the following composition:

| Ingredient | Percent | Weight (g) |
| --- | --- | --- |
| Sucrose Polyester | 75.00 | 108.00 |
| Soybean Oil | 24.35 | 35.064 |
| Lecithin | 0.275 | 0.396 |
| Mono/diglyceride | 0.225 | 0.324 |
| Flavor | 0.125 | 0.18 |
| Beta-carotene | 0.025 | 0.036 |
| Total | 100.0 | 144.0 |

The aqueous phase was prepared by mixing the following composition with a Waring Blender:

| Ingredient | Percent | Weight (g) |
| --- | --- | --- |
| Water | 82.84 | 248.5 |
| Nonfat dry milk | 8.33 | 25.0 |
| Salt | 8.33 | 25.0 |
| Potassium sorbate | 0.50 | 1.5 |
| Total | 100.0 | 300.0 |

The oil phase (144 g) was transferred to a water-jacketed beaker which was heated at 30° C., and stirred with an overhead mixer (Lightning Mixer). A portion of the aqueous phase (36 g) was slowly added while stirring in the jacketed beaker, The ratio of oil phase to aqueous phase was 80:20.

The final composition of the water-in-oil emulsion prepared as described above was as follows:

| Ingredient | Percent |
| --- | --- |
| Sucrose polyester | 60.00 |
| Soybean oil | 19.48 |
| Water | 16.56 |
| Nonfat dry milk | 1.67 |
| Salt | 1.67 |
| Lecithin | 0.22 |
| Mono/diglyceride | 0.18 |
| Flavor | 0.10 |
| Potassium sorbate | 0.10 |
| Beta-carotene | 0.02 |
| Total | 100.00 |

Preparation of the Final Combined Emulsion Product—The oil-in-water emulsion had been previously cooled by refrigeration below the melting point of the sucrose polyester to effectively trap the oil as solid emulsified particles. A portion of the cooled oil-in-water emulsion (180 g) was blended into an equal amount of the water-in-oil emulsion (180 g) while it was being stirred in a water-jacketed beaker at 30° C. The jacketed beaker was cooled to 25° C. and stirring was continued until the product started to thicken. When the product reached the approximate viscosity of softened margarine, it was transferred to margarine tubs and hardened at in the refrigerator at 4° C.

The composition of the final combined product was as follows:

| Ingredient | Percent |
| --- | --- |
| Sucrose polyester | 50.05 |
| Water | 30.94 |
| Soybean oil | 9.74 |
| Whole egg mix | 4.20 |
| Vinegar | 1.32 |
| Salt | 0.98 |
| Egg yolk | 0.84 |
| Nonfat dry milk | 0.84 |
| Xanthan | 0.47 |
| Sucrose | 0.31 |
| Lecithin | 0.11 |
| mono/diglyceride | 0.09 |
| Flavor | 0.05 |
| Potassium sorbate | 0.05 |
| Beta-carotene | 0.01 |
| Total | 100.00 |

The firmness of the product was determined using a cone penetrometer at both refrigerated and room temperature. A 60° cone was used to penetrate to a total depth of 5 mm. The values were compared with margarine and butter.

| Product | Penetrometer Firmness (grams) | |
| --- | --- | --- |
| | Refrigerated | Room Temperature |
| Combined emulsion | 516 ± 35 | 24.7 ± 1.7 |
| Tub margarine | 33.6 ± 2.8 | 10.7 ± 0.9 |
| Stick margarine | 127 ± 4.1 | 30.9 ± 1.8 |
| Butter | 563 ± 127 | 18.6 ± 1.6 |

The combined emulsion product made with sucrose polyester was firmer than both margarine products at refrigerator temperature, but as it warms up to room temperature, the differences are minimized. At both temperatures, the combined emulsion product is similar in firmness to butter. The product spreads as easily as butter with a butter knife. Photomicrographs taken of this product clearly show the oil-in-water emulsion embedded or physically trapped with a continuous phase made up of the water-in-oil emulsion. Refer to FIG. 1 for a typical photomicrograph of the product.

What is claimed is:

1. An edible fat-containing product comprising a water-in-oil emulsion wherein the oil phase in the water-in-oil emulsion has at least 5% by weight of an oil which crystallizes at a temperature of 20° C. and wherein the water-in-oil emulsion has discrete droplets of an oil-in-water emulsion dispersed therein.

2. A product in accordance with claim 1 wherein the oil phase of the oil-in-water emulsion has a melting point above about 15° C.

3. A product in accordance with claim 1 wherein the oil phase of the water-in-oil emulsion has a low HLB emulsifier dispersed therein.

4. A product in accordance with claim 3 wherein the HLB of the emulsifier is below about 4.5.

5. A product in accordance with claim 3 wherein the emulsifier is present at a level of from about 0.5% to about 1.5% by weight based on the weight of the oil phase in the water-in-oil emulsion.

6. A product in accordance with claim 1 wherein the aqueous phase of the water-in-oil emulsion is thickened by the presence of a hydrated hydrocolloid in the aqueous phase.

7. A product in accordance with claim 6 wherein the hydrocolloid is present in the aqueous phase at a level of from about 0% to about 5% by weight based on the weight of the aqueous phase.

8. A product in accordance with claim 6 wherein the hydrocolloid is selected from the group consisting of gelatin, alginates, gum arabic, gum karaya, locust bean gum, carrageenan, starch, pectin, xanthan gum and maltodextrins.

9. A product in accordance with claim 1 wherein the oil phase of the water-in-oil emulsion is selected from triglyceride oils, polyol fatty acid polyesters and mixtures thereof.

10. A product in accordance with claim 9 wherein the oil phase in the water-in-oil emulsion is a triglyceride oil.

11. A product in accordance with claim 9 wherein the oil phase in the water-in-oil emulsion is a polyol fatty acid polyester.

12. A product in accordance with claim 1 wherein the water phase of the oil-in-water emulsion contains a high HLB emulsifier.

13. A product in accordance with claim 12 wherein the emulsifier has an HLB above about 4.5.

14. A product in accordance with claim 12 wherein the emulsifier is selected from the group consisting of egg protein, milk protein and polysorbate 60.

15. A product in accordance with claim 1 wherein the oil phase of the oil-in-water emulsion has a melting point below about 20° C.

16. A product in accordance with claim 1 wherein the oil phase of the oil-in-water emulsion has a melting point above about 20° C.

17. A product in accordance with claim 1 wherein the oil phase of the oil-in-water emulsion is selected from triglyceride oils, polyol fatty acid polyesters and mixtures thereof.

18. A product in accordance with claim 17 wherein the oil phase is a triglyceride oil.

19. A product in accordance with claim 17 wherein the oil phase is a polyol fatty acid polyester.

20. A method for manufacture of an edible fat-containing product which is a water-in-oil emulsion having discrete droplets of an oil-in-water emulsion dispersed therein, the method comprising:

(a) providing an oil-in-water emulsion at a temperature wherein the oil phase is liquid;

(b) providing a water-in-oil emulsion at a temperature wherein the oil phase is liquid;

(c) cooling the water-in-oil emulsion to a temperature such that at least about 5% of the oil phase is crystallized;

(d) combining the oil-in-water emulsion and the cooled water-in-oil emulsion; and (e) immediately cooling the combined emulsions with agitation so that the oil phase of the water-in-oil emulsion substantially crystallizes to entrap discrete droplets of the oil-in-water emulsion.

\* \* \* \* \*